C. H. HALL.
Improvement in Steam Vacuum-Pumps.
No. 131,530. Patented Sep. 24, 1872.

Witnesses:
Arnold Hörmann.

Inventor:
C. H. Hall.
by his attorney
J. S. Stetson.

UNITED STATES PATENT OFFICE.

CHARLES H. HALL, OF NEW YORK, N. Y.

IMPROVEMENT IN STEAM VACUUM-PUMPS.

Specification forming part of Letters Patent No. 131,530, dated September 24, 1872.

CASE P.

*To all whom it may concern:*

Be it known that I, CHARLES H. HALL, of New York city, in the State of New York, have invented a certain Improvement in Steam Pumping Apparatus, of which the following is a specification:

To distinguish this from other inventions of my own which are somewhat analogous, I will designate this particular invention by the letter P.

The apparatus belongs to that class of steam-pumps in which the solid working parts are small relatively to the capacity of the apparatus, and the steam is caused to act by direct pressure upon the water. There is a marked gain by the reduction of rubbing-surfaces and the great efficiency and small cost of the apparatus.

The following is a description of what I consider the best means of carrying out the invention. The accompanying drawing forms a part of this specification.

Figure 1:
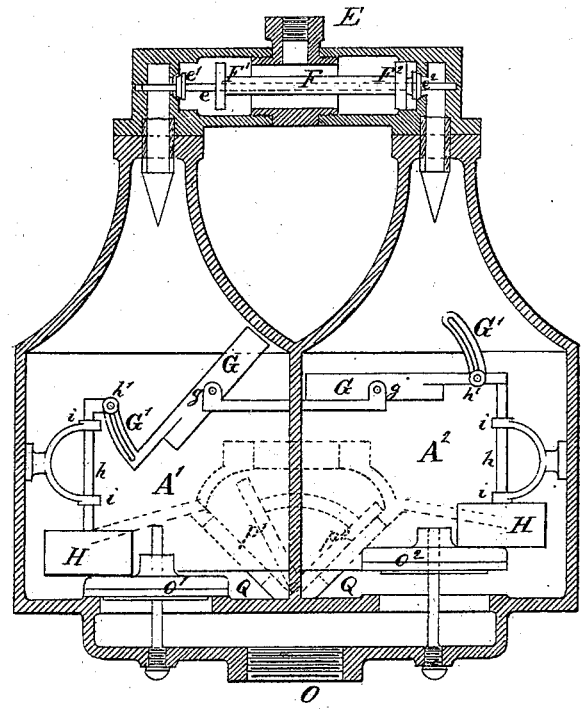
Figure 2:
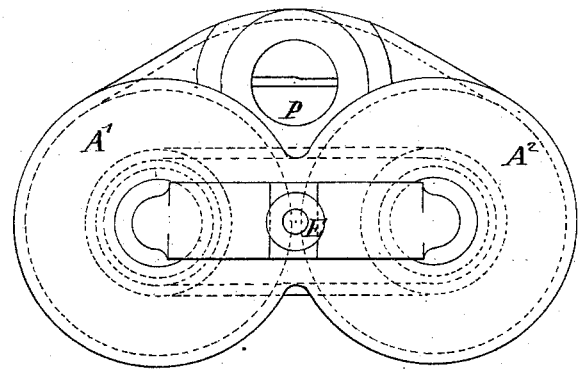

Figure 1 is a vertical section, and Fig. 2 is a plan view.

Similar letters of reference indicate like parts in all the figures.

$A^1$ $A^2$ are vessels of equal size, formed of cast-iron, in one piece, and adapted to resist a strong internal pressure, as also to resist the external pressure of the atmosphere when a vacuum is formed therein. E is a steam-pipe which communicates with a boiler, not represented. The steam-pipe E is of small internal diameter, or there must be at some point in the steam-connection a narrow passage through which the steam cannot flow readily, except in a very contracted current. O is a pipe of sufficient size, communicating with the tank or well from which the water is to be taken; and P is a delivery-pipe, adapted to convey away the water under pressure and discharge it at a higher point, or wherever it is desired to force the water. The chambers $A^1$ and $A^2$ are filled alternately with steam and water. The action is self-controlling. When the steam is excluded from a chamber, the water is received from the pipe O and fills it. Meantime the opposite chamber is being emptied of its water by the steam entering at its top and pressing downward on the surface with such force as to discharge the water outward through the discharge-pipe. When the water is thus expelled, the reception of steam is cut off, and the chamber is soon again filled with water. While one chamber is being filled with water the other is expelling the water. The steam-valves $e^1$ $e^2$, mounted on the same stem $e$, alternately close and open the communication between the steam-pipe E and the upper ends of the respective chambers. The sleeve F fits loosely around the rod or stem $e$, and carries a disk, $F^1$, at one end, and $F^2$ at the other. The sleeve F being shorter than the distance between the valves, there is room for the sleeve with its disks to move a considerable distance endwise on the valve-stem. The valve $e^1$ is represented as open. In this condition the steam enters the chamber $A^1$ and expels the water. During the expulsion of the water there is a continuous condensation of the steam going on in the chamber $A^1$; but the amount thus condensed is trifling, because the moment a layer of hot water is formed on the surface by the contact of the steam, the hot particles remain on the surface and protect the steam from the cooling effect of the particles below. But an agitation of the water at any moment increases the condensation. I have devised means for presenting suddenly a considerable quantity of previously cold water to the action of the steam, and for increasing the condensation, just before the vessel $A^1$ is emptied. The effect is to so increase the current of steam from the pipe E through the valve $e^1$ that it will, by its rapid rush past the disk $F^1$, induce a movement of the sleeve F and its attachments. The active stroke of this sleeve against the valve $e^1$, and the direct pressure of the current of steam acting thereon, induce a movement of the stem $e$ and its attachments, thereby closing the valve $e^1$, and opening the valve $e^2$. I effect the agitation of the water at the proper moment by suspending a quantity in a tilting cup or dish, G, which turns on pivots $g$. The cup may be made of wood, hard rubber, or other non-conductor of heat, so that it receives little heat from the steam below it, and becoming filled when in a horizontal position by the rising of the cold water above it, the sinking of the water as it is expelled by the steam leaves this vessel G standing in the midst of the steam-space surrounded by steam, and containing water, only the upper surface of which is heated. As the surface of the water continues to lower, it ultimately ceases to support the float H, carrying a vertical stem, $h$, which is supported in fixed guides $i$, with liberty to move vertically to a limited extent. The sinking of this float acts by means of a pin, $h'$, fixed to a short arm or branch, as shown, on the lower end of a slotted arm, $G^1$, on the vessel G, and commencing to incline it, causes the whole mass of water in the cup G to pour out. The pouring of this water through the steam-space acts in a twofold manner: first, directly to condense the steam which comes in contact with it; and, second, indirectly to agitate the water below into which it falls. I can make the condensation due to this cause occur earlier or later by changing the relations of the parts. A very small quantity of steam may be expelled through the delivery-passage with the water discharge before or simultaneously with the tilting of the vessel G.

The float H when down rests upon the water-induction valve $o'$. In case there is any appreciable friction in the passage of the rod $h$ through the guides I, the lifting of the valve $o'$ by the induction of the water aids the float in rising to as high a position as it is allowed by the guides. It is by this means that the vessel G is restored to its proper horizontal position. This is effected by the contact of the pin $h^1$ with the upper end of the slot in the arm $G^1$. The cone points, shown extending down from the steam entrances at the tops of the respective chambers, allow the steam to enter quietly through a series of holes around them above. The steam is, by reason of this distribution, and the tapered form of the metal extending below, distributed gently and so as to allow no return current or eddy.

I claim as my invention—

1. The movable disks $F^1$ $F^2$, in combination with each other and with the steam-valves $e^1$ $e^2$, and adapted to serve in controlling the admission of steam to the chambers $A^1$ $A^2$, as herein specified.

2. The within described arrangement of the float H, water-induction valve $o^1$, and tilting-pan G $G^1$, so as to render available the force of the water-induction in restoring the vessel G to its horizontal position, as specified.

In testimony whereof I have hereunto set my hand this 18th day of May, 1872, in the presence of two subscribing witnesses.

C. H. HALL.

Witnesses:
ARNOLD HÖRMANN,
W. C. DEY.